United States Patent [19]

Pelzer

[11] Patent Number: 4,938,912
[45] Date of Patent: Jul. 3, 1990

[54] METHOD FOR MAKING PERFORATED COMPONENTS

[76] Inventor: Helmut Pelzer, Neue Strasse 5, D-5804 Herdecke-Ende, Fed. Rep. of Germany

[21] Appl. No.: 282,400

[22] Filed: Dec. 8, 1988

[30] Foreign Application Priority Data

Dec. 8, 1987 [DE] Fed. Rep. of Germany ....... 3741499

[51] Int. Cl.⁵ ............................................. B29C 65/10
[52] U.S. Cl. ..................................... 264/504; 156/252; 264/46.8; 264/154; 264/257; 425/388
[58] Field of Search ............... 264/504, 510, 511, 553, 264/154, 156, 101, 257, 46.8, 258, 571; 425/387.1, 388; 156/82, 497, 252, 253, 245, 285, 382

[56] References Cited

U.S. PATENT DOCUMENTS

| | | | |
|---|---|---|---|
| 2,032,923 | 3/1936 | Eldridge | 264/504 |
| 3,012,918 | 12/1961 | Schaar | 264/156 |
| 3,932,252 | 1/1976 | Woods | 264/46.8 |
| 3,979,494 | 9/1976 | Ericson | 264/154 |
| 4,303,609 | 12/1981 | Hureau et al. | 264/504 |
| 4,692,199 | 9/1987 | Kozlowski et al. | 264/511 |
| 4,786,351 | 11/1988 | Elliott et al. | 425/407 |

FOREIGN PATENT DOCUMENTS

| | | | |
|---|---|---|---|
| 2331864 | 1/1975 | Fed. Rep. of Germany | 156/285 |
| 2409497 | 9/1975 | Fed. Rep. of Germany . | |
| 1325622 | 8/1973 | United Kingdom | 264/46.8 |

Primary Examiner—Jan H. Silbaugh
Assistant Examiner—Mathieu Vargot
Attorney, Agent, or Firm—Ralf H. Siegemund

[57] ABSTRACT

A deep drawn, synthetic-foil-sealed textile with foamed backing is perforated by applying hot pressurized air towards the foil, locally and in discrete spots, so that the foil melts locally, and foil material is blown into the textile under formation of a perforation duct that is bonded to the textile material underneath.

2 Claims, 1 Drawing Sheet

METHOD FOR MAKING PERFORATED COMPONENTS

BACKGROUND OF THE INVENTION

The present invention relates to perforating shaped parts such as deep drawn components and/or synthetic foil sealed parts and/or textile strata with foam backing, such as used as cover, lining, sound attenuation, heat barrier, or the like, for example, in the automobile industry.

Parts of the type to which the invention pertains are known. For example, certain shaped parts are comprised of a textile material with a foamed backing on one side. The free, or open side, of this material carries, for example, a synthetic foil which is bonded thereto or otherwise applied. The synthetic foil is essentially an auxiliary medium serving as a shape giving structure so that the textile material, i.e. the fibrous material, including the foil, can, in fact, be deep drawn to ultimately obtain the desired contour of a particular part. For reasons of climate or noise attenuation or both or other functions, parts of the type to which the invention pertains should not be provided with a synthetic foil which covers a closed area. Rather, there must be "access", for example, to sound, so that sound can be absorbed by foamed material and is not be conducted away, reflected, or otherwise left unattenuated owing to the closed contour of the synthetic foil.

DESCRIPTION OF THE INVENTION

It is, therefore, an object of the present invention to provide a new and improved method for obtaining perforation in deep drawn synthetic foil covered and sealed textile parts having foamed backing, particularly of the type used in covers, lining, or other attenuation material.

It is a particular object of the present invention to avoid problems outlined above, and to provide a method and equipment to obtain such perforations in a very simple and economical fashion.

In accordance with the preferred embodiment of the present invention, it is suggested to provide the foil with localized hot pressurized air, right where the perforations are to be produced, so that the foil melts locally in discrete points, whereby the foil as it melts surrounds the opening thus produced and form a duct into the fibrous layer and will be bonded to the textile material behind to thereby establish a, so to speak, fixed boundary zone. Equipment for practicing the invention includes a mold or die-like member for receiving the foil plus textile layer. This die or mold is provided with bores in a distribution pattern that corresponds to the distribution pattern of the perforations to be produced, the patterns are preferably of a regular variety. The bores are connected to a hot air chamber. A holding frame is provided to hold the foam part in the mold as the hot air chamber is connected to a pressurization force.

The equipment in accordance with the invention, practices the method, wherein the synthetic foil of the form part melts in discrete points adjacent to the bores of the mold or die through hot air, for example, at a temperature between 140° and 250° centigrade, depending on the particular synthetic material used. In the area of these bores of the mold or die, where the hot pressurized air is applied, the foil melts and owing to the air pressure, the molten material is, so to speak, blown into the textile material underneath, and thereby provide a boned duct-like connection of the foil. Most importantly, of course, is that the continuation of the blowing effect for a short period of time makes sure that the openings, thus produced, will not reclose for one reason or another.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates the lower portion 2 of the mold with vacuum ducts 3. A foil of synthetic material together with a layer of textile material is collectively denoted generally as reference numeral 1. This twin layer is placed into the particularly contoured mold part as illustrated, which, of course, is just an example, and illustrates a kind of trough. As vacuum is applied through these ducts and channels 3, the flexible foil with textile on top is sucked against the walls of the die cavity, and thereby forces this foil and textile configuration to assume the desired shape and contour. Following this preparation, a top mold part 4 is placed, as shown in FIG. 2, for establishing now a closed mold cavity. A suitable deep drawn part 1 together with an upper portion 4 of the mold, defining the interior of the cavity, establish a hollow space which is now filled with a foamed or foaming material 5. For example, polyurethane is caused to foam in that space and to occupy that space, giving rise to the form backing 5 for the foil plus textile combination 1. Basically, the foil has also the function to avoid that foam can enter the vacuum duct in channel 3.

Figure 1:
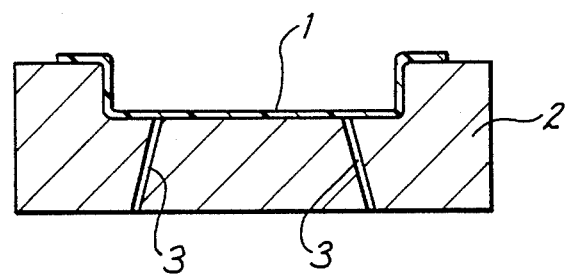
FIG. 1 and 2 are cross-sections through a mold demonstrating progressively the making of a form part by way of example and in relation to which the inventive method can be practiced.
Figure 2:
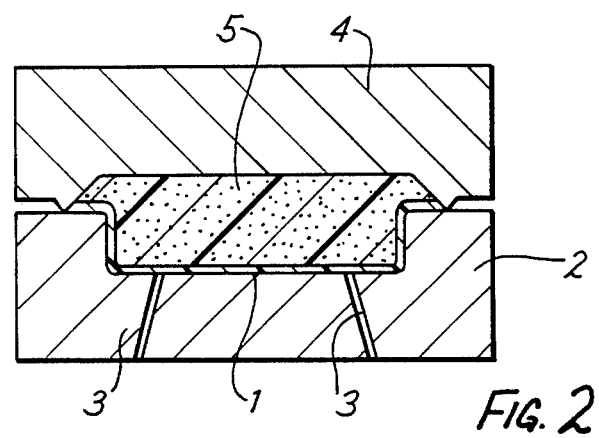
Figure 3:
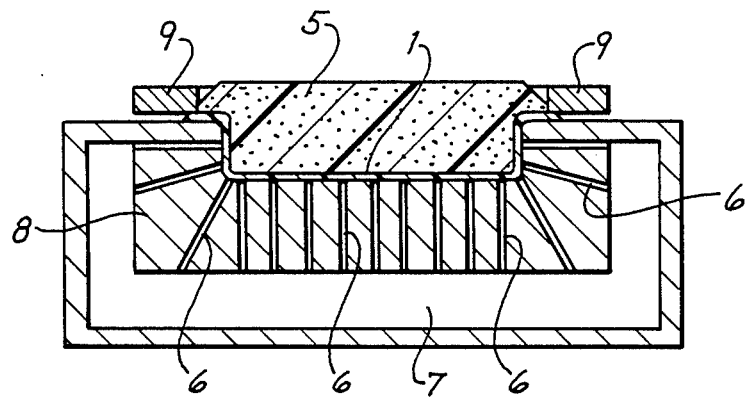
FIG. 3 shows die equipment in accordance with the preferred embodiment of the present invention for practicing the best mode thereof.

Having thus prepared the particularly contoured part 1-5, it is removed from the mold of FIGS. 1 and 2, and placed into a particular die bed 8, as shown in FIG. 3. This die bed 8 is contoured, for example, adjacent the area of the foil 1, in a configuration that matches the die cavity portion of mold part 2. In addition, however, this die part 8 has a plurality of bores 6 in a pattern of distribution and arrangement which has nothing to do with bores 3 in FIGS. 1 and 2. Rather, the bores 6 represent, so to speak, a perforation pattern that is to be produced in the foil 1.

The die part 8, actually, is in parts embedded in a chamber 7 which is a plenum chamber for a hot air force, which is fed into the plenum chamber under pressure. Hot air, for example, may have a temperature between 140° and 150° centigrade depending on the melting point of the foil material used in 1. The plenum chamber 7 is otherwise closed by the form part as placed. Other configurations, of course, are easily conceivable demonstrating the adaptability of the invention to shaping requirements.

The form part 1 is in addition held by a frame 9 and urged against the chamber wall 9 and the mold or die element 8 to obtain the desired position and adjustment. This, in fact, is the principle function of the frame 9 to obtain and maintain a particular position of the foil 1 in relation to the pattern of bore 6.

Now, as hot pressurized air is applied to the plenum chamber 7, it flows into the ducts 6 and against the foil 1. Therefore, the foil will locally be heated and the heating is such that the foil material is going to melt right in the area of contact with the hot air. As the foil melts, a perforation is produced in each instant, which, however, means that hot air can now flow unimpededly into the textile material which, in fact, means that certain molten foil parts will be blown into the textile material. This, of course, should not be understood in the literal sense, in other words, the hot air is not pressurized to such an extent that the molten plastic is converted into droplets which are blown into and through the textile material. Rather, it is to say that locally a bore is produced and adjacent thereto the material is molten and is sort of flared outwardly into the textile material without losing coherency with the rest of the foil. This way bonding obtains between what now becomes a perforation wall, pertaining to the foil and the textile material underneath.

A basic aspect of the invention as practiced is that, in fact, a duct may be formed that leads, depending upon the thickness of the textile material, possibly up into the foam layer 5, which duct will, following cooling, remain and there is no reclosing of the perforation. The duration of this treatment, the air temperature, the pressure, depending, of course, upon the foil material, also on the size of the openings, and vary from case to case.

The invention is not limited to the embodiments described above, but all changes and modifications thereof not constituting departures from the spirit and scope of the invention are intended to be included.

I claim:

1. Method for perforating a deep drawn component made of a three layer configuration which includes a synthetic foil, a textile layer having and carrying said foil on one side, and a foam backing on another, opposite side of the textile layer, comprising the steps of:

applying towards the foil locally and in discrete spots hot pressurized air so that locally and in said spots the foil melts forming perforations in the foil and ducts form in the textile and into the adjoining foam; and bonding foil material under formation of these perforations to the textile material underneath by melted foil material and as blown by the hot air into the textile material, around and adjacent each such perforation.

2. Method as in claim 1, and including using a die for receiving component, said die being provided with a plurality of distributed bores;

providing a hot air chamber with pressurization source and providing for connection to said bores for causing hot air to be applied to the foil at ends of the bores; and fixing and holding component in said die to establish definite locations for the production of perforations in component where facing ends of the bores.

* * * * *